United States Patent [19]

Inoue

[11] 4,289,433
[45] Sep. 15, 1981

[54] BEVEL GEAR CUTTING DEVICE

[76] Inventor: Toshizo Inoue, 1-6-46 Kamitakamaru 1-chome, Tarumi-ku, Kobe-shi, Hyogo-ken, Japan

[21] Appl. No.: 79,313

[22] Filed: Sep. 27, 1979

[51] Int. Cl.³ ............................................. B23F 5/20
[52] U.S. Cl. ..................................... 409/29; 409/27; 409/43
[58] Field of Search ............... 409/43, 42, 27, 28, 409/29, 30, 45

[56] References Cited

U.S. PATENT DOCUMENTS

| | | | |
|---|---|---|---|
| 709,235 | 9/1902 | Monneret | 409/43 |
| 2,104,184 | 1/1938 | Candee | 409/43 |
| 2,145,000 | 1/1939 | Wildhaber | 409/29 |
| 2,606,481 | 8/1952 | Matera et al. | 409/43 |
| 2,794,302 | 6/1957 | Deakin | 409/43 X |
| 2,824,498 | 2/1958 | Baxter, Jr. et al. | 409/27 X |
| 2,895,385 | 7/1959 | Carlsen | 409/44 |

*Primary Examiner*—William R. Briggs
*Attorney, Agent, or Firm*—Pearne, Gordon, Sessions, McCoy & Granger

[57] ABSTRACT

A bevel gear cutting device which comprises a machine base, an upright support shaft extending upwardly from the base, a table support member rotatably supported at one end on the shaft, a gear blank rotating and rocking mechanism support member rotatably supported at one end on the shaft above the table support member, a gear blank rotating mechanism slidably supported on the second-mentioned support member, a gear blank rocking mechanism slidably supported on the second-mentioned support member adjacent to the gear blank rotating mechanism, a main shaft extending through the gear blank rotating and rocking mechanisms and drive means for the main shaft.

5 Claims, 7 Drawing Figures

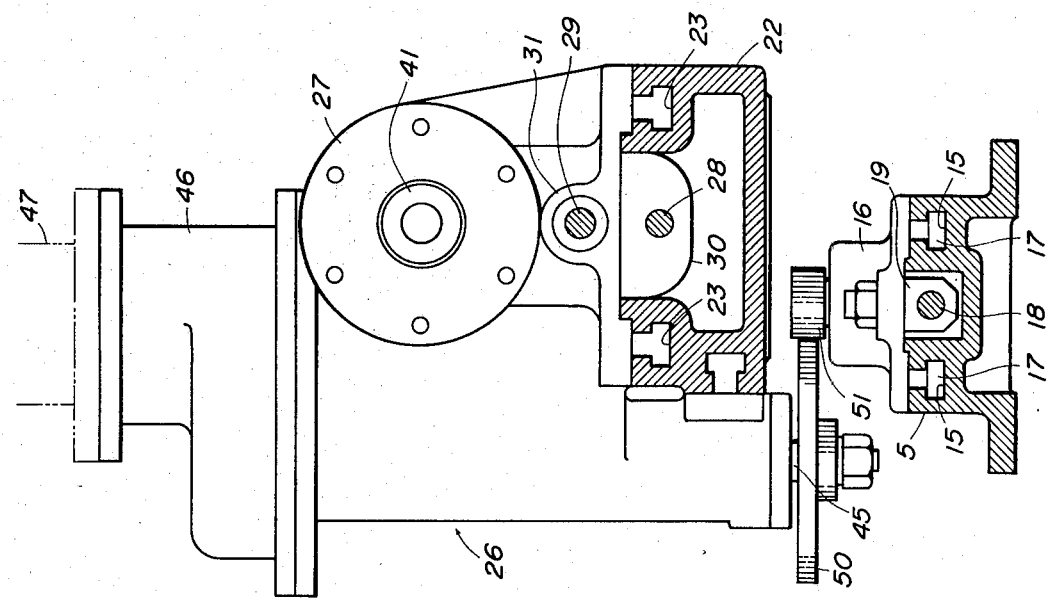
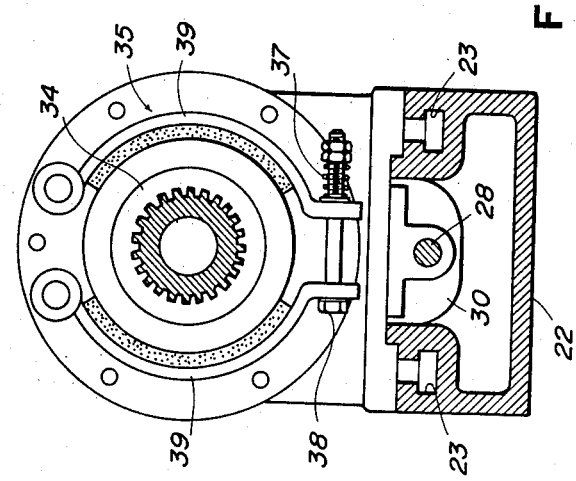
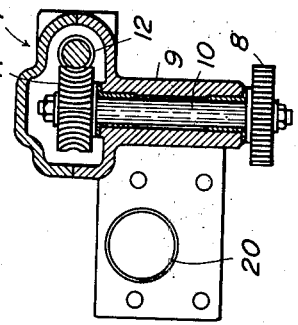

BEVEL GEAR CUTTING DEVICE

BACKGROUND OF THE INVENTION

This invention relates to a bevel gear cutting device. In any one of bevel gears, the teeth on the gear converge towards the virtual apex of the conical shape of the gear and continuously increase their cross-section areas from the end adjacent to the virtual apex or the smaller diameter end towards and to the end opposite to the virtual apex or the larger diameter end of the gear. Therefore, hithertofore, the bevel gear cutting operation has encountered many difficulties. In prior art bevel gear cutting methods, the following three types of methods have been known, that is, the template method, the formed method and the generating method as in the case of the spur gear cutting. However, the template method has been most commonly employed and this bevel gear cutting method is generally classified into the profiling system, the Bilgram system, the Reinecker system and the Gleason system.

In the template type bevel gear cutting device utilizing the profiling system, the template is mounted on a bevel gear blank in a position spaced from the virtual apex of the conical shape of the gear blank making the best use of the shape of a straight bevel gear and the cutter is linearly and reciprocally moved along the template between the virtual apex of the bevel gear blank and the template so that the cutter is always directed towards the apex of the pitch cone of the bevel gear blank to thereby cut the teeth on the bevel gear blank one tooth at a time. However, the cutting efficiency of the profiling system of the template method is low and there is the inconvenience that the template has to be changed each time a particular bevel gear is cut.

On the other hand, the bevel gear cutting device utilizing the Bilgram or Reinecker system is designed to position a bevel gear blank so that the gear blank will roll in engagement with a virtual crown gear and the gear blank has movement imparted thereto so that the blank rolls on the virtual crown gear with respect to the cutter which represents one surface of the teeth of the virtual crown gear on the opposite side of the shaft on which the gear blank is mounted to thereby cut teeth on the gear blank. Therefore, in the bevel gear cutting device based on the Bilgram or Reinecker system, the gear tooth has to be first finished on one surface and then on the other surface by changing the orientation of the cutter and therefore, the cutting efficiency of the gear cutting device is very low and it is difficult to cut the teeth on the gear blank with precision.

In the profiling bevel gear cutting device utilizing the Gleason system, a straight cutter representing the left- and right-hand surfaces of a virtual crown gear is reciprocally moved on a rocking plate which imparts rocking movement to the crown gear and the gear blank is rotated in proper engagement with the crown gear so as to cut teeth on the gear blank one tooth at a time to thereby provide an involute profile by the generating tooth cutting method. Thus, the Gleason system is higher in operation efficiency and precision than the above-mentioned profiling system, but since the tooth cutting is effected by reciprocally moving the cutter as in the case of the profiling system, the Gleason system cannot improve the cutting efficiency substantially. Also since the Gleason system cuts teeth on a gear blank intermittently instead of continuously by a rotating hob, the Gleason system cannot obtain a smooth involute curve.

SUMMARY OF THE INVENTION

Thus, the present invention is to provide a novel and improved bevel gear cutting device which can effectively eliminate the disadvantages inherent in the prior art bevel gear cutting devices referred to hereinabove.

According to the present invention, a bevel gear blank is mounted so as to rotate about the axis of the cone of the gear blank, the blank is rotated at a low speed and at the same time the blank or a high speed rotating cutter is rocked in a plane through the cone axis an angular distance corresponding to the height of one tooth by a rotating cam while the blank is rotating by an angular distance of one pitch of tooth, the cutter is moved along the generatrix of the gear blank cone to intermittently cut the blank to form an involute profile on the gear blank to thereby perform an efficient and precise gear tooth cutting operation.

The above and other objects and attendant advantages of the present invention will be more readily apparent to those skilled in the art from a reading of the following detailed description in connection with the accompanying drawings which show one preferred embodiment of the invention for illustration purpose only, but not for limiting the scope of the same in any way.

BRIEF DESCRIPTION OF THE DRAWINGS

FIG. 3 is a cross-sectional view substantially taken along the line X—X of FIG. 2;

FIG. 4 is a cross-sectional view substantially taken along the line Y—Y of FIG. 2;

FIG. 5 is a cross-sectional view substantially taken along the line Z—Z of FIG. 2;

PREFERRED EMBODIMENT OF THE INVENTION

Figure 1:
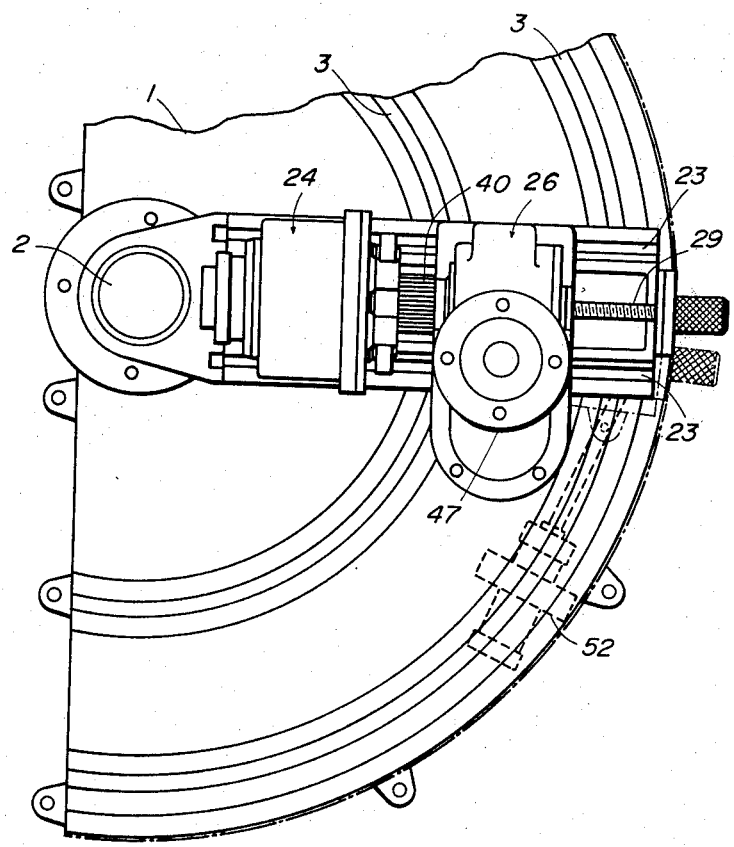
FIG. 1 is a fragmentary top plan view especially showing the gear blank rotating and rocking mechanisms of the bevel gear cutting machine constructed in accordance with the present invention.
Figure 2:
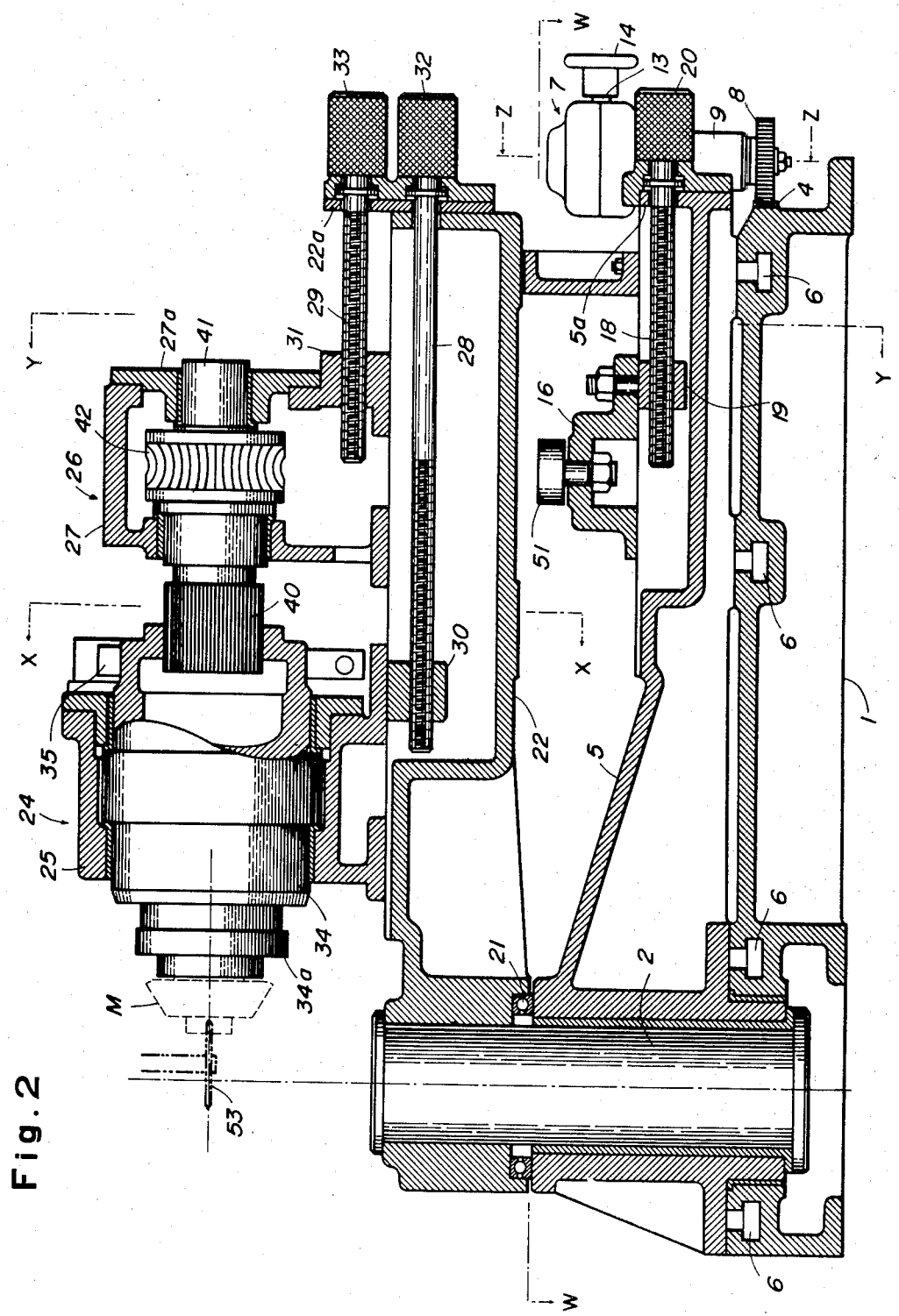
FIG. 2 is a vertically sectional view on an enlarged scale of the bevel gear cutting machine.
Figure 7:
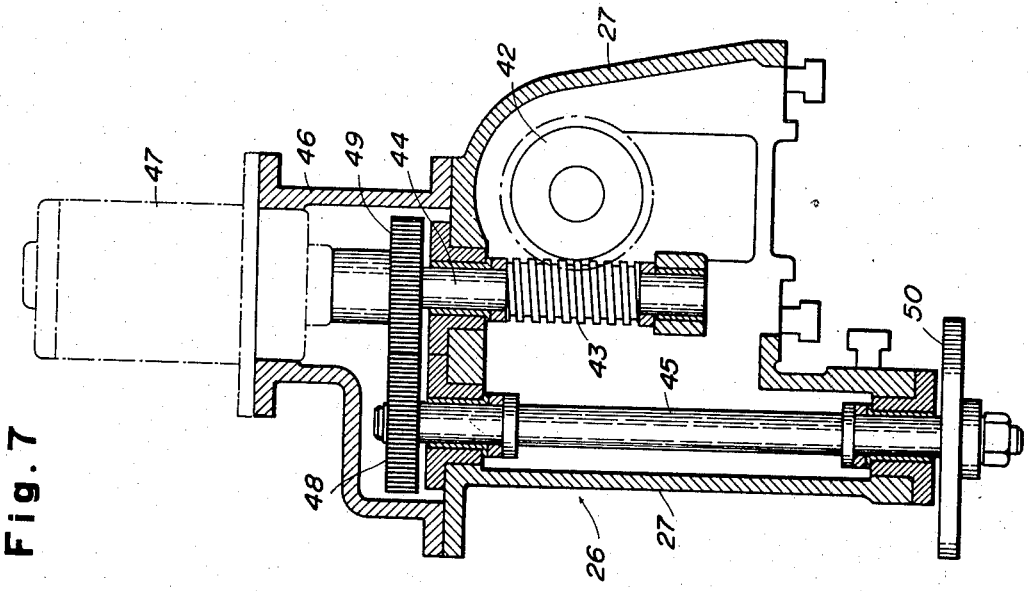
FIG. 7 is a cross-sectional view of the drive mechanism of the bevel gear cutting machine.
Figure 6:
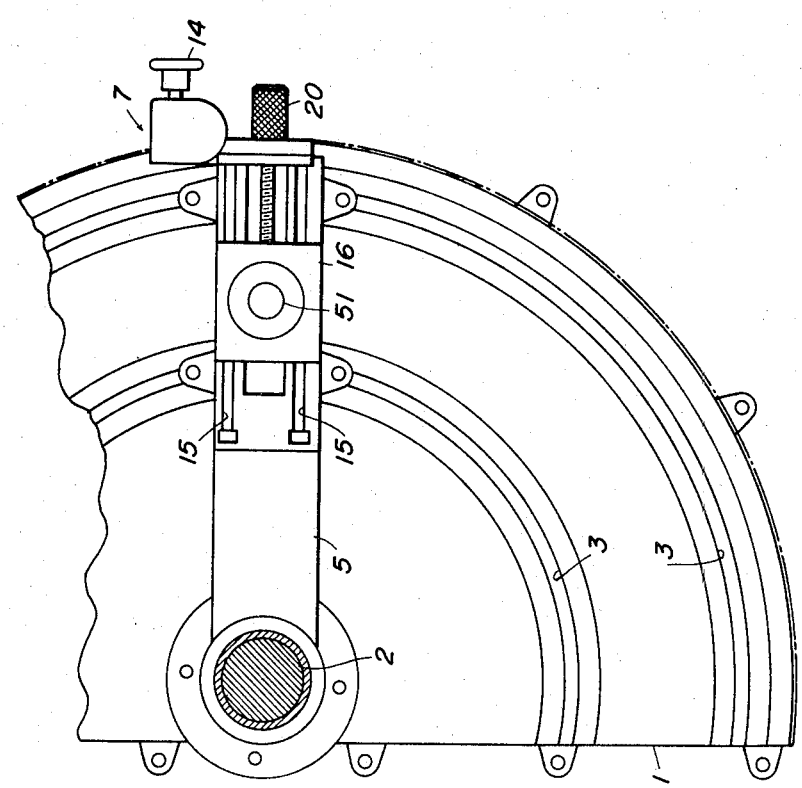
FIG. 6 is a fragmentary top plan view on a reduced scale as seen along the line W—W of FIG. 2.

The present invention will be now described referring to the accompanying drawings and, more particularly, to FIGS. 1 and 2 thereof in which one preferred embodiment of the bevel gear cutting machine of the invention is shown. The bevel gear cutting machine generally comprises a machine base 1 of semi-circular shape and a support shaft 2 extending vertically and upwardly from the machine base 1 adjacent to the straight side edge of the machine base in the center of the straight side edge. A plurality of parallel and spaced semi-circular roller guide grooves 3 and 3 are formed in the upper surface of the machine base partially surrounding the support shaft 2 and teeth 4 are formed along the arcuate side face of the machine base 1. Engaged in the guide grooves 3 are rollers 6 depending from the undersurface of a table support member 5 which is journalled at one end (the left-hand end as seen in FIG. 2) on the support shaft 2 for rotation about the shaft. An adjusting member 7 is mounted at the other end (the right-hand end as seen in FIG. 2) of the table support member 5 and has a pinion 8 at the lower end for engaging the teeth 4 so that the position of the table support member 5 can be adjusted relative to the machine base 1.

As more clearly shown in FIG. 5, the adjusting member 7 further includes a casing 9 secured to the table support member 5, a rotary pinion shaft 10 extending through the casing 9 and having the pinion 8 secured at the lower end thereof and a worm wheel 11 mounted at the upper end thereof, a worm 12 mounted on a worm shaft 13 and engaging the worm wheel 11 and a manual adjusting knob 14 secured to one or the outer end of the worm shaft 13. Thus, when the manual adjusting knob 14 is manually rotated by a desired angle so as to rotate the worm shaft 13, the rotation of the worm shaft 13 in turn rotates the pinion shaft 10 through the worm wheel 11 and worm 12 to thereby rotate the table support member 5 along the arcuate toothed side face 4 of the machine base 1 by the angular distance corresponding to the rotation angle of the adjusting knob 14 by means of the meshing teeth 4 and pinion 8.

The table support member 5 has formed on the upper surface thereof a pair of parallel and spaced roller guide grooves 15 at right angles to the axis of the support shaft 2 for receiving and guiding rollers 17 depending from the undersurface of a holding table 16 which is supported on the upper surface of the table support member 5 for slidable movement on the support member.

A threaded rod 18 is supported at one or the right-hand end as seen in FIG. 2 in one or the right-hand end wall 5a of the table holding member 5 as seen in FIG. 2 in a cantilever fashion and extends inwardly from the end wall between and parallel to the guide grooves 15. An internally threaded bracket 19 depends from the undersurface of the holding table 16 for threadably receiving the threaded rod 18 and a manual knob 20 is secured to the extreme right-hand end as seen in FIG. 2 of the threaded rod which extends outwardly from the end wall 5a whereby when the knob 20 is rotated to rotate the threaded rod 18, the rollers 17 moved along the guide grooves 15 resulting in the adjustment of the position of the holding table 16 with respect to the table support member 5.

A gear blank rotating and rocking mechanism support member 22 is journalled at one end of the left-hand end as seen in FIG. 2 on the support shaft 2 by means of thrust bearings 21. Like the table support member 5, the support member 22 also has formed in the upper surface thereof a pair of parallel and spaced guide grooves 23 at right angles to the axis of the support shaft 2 for slidably receiving the frame 25 of a gear blank rotating mechanism 24 and the frame 27 of a gear blank rocking mechanism 26. These mechanisms 24 and 26 are slidably supported on the upper surface of the support member 22.

An externally threaded rod 28 is supported at one or the right-hand end as seen in FIG. 2 in an end plate 22a secured to the right-hand end wall of the support member 22 in a cantilever fashion and extends between and parallel to the guide grooves 23 and an internally threaded bracket 30 depends from the undersurface of the frame 25 of the gear blank rotating mechanism 24 and threadably receives the threaded rod 28. Similarly, an externally threaded rod 29 is supported at the right-hand end as seen in FIG. 2 in the end plate 22a secured to the adjacent end wall of the support member 22 in a similar manner above the threaded rod 28 and an internally threaded bracket 31 is secured to and depends from the undersurface of a member 27a which is in turn secured to the adjacent end of the frame 27 of the gear blank rocking mechanism 26. The internally threaded bracket 31 threadably receives the threaded rod 29. Manual knobs 32 and 33 are secured to the extreme right-hand ends which extend outwardly of the end plate 22a secured to the adjacent end of the support member 22. Thus, when the knobs 32 and 33 are rotated, the positions of the frames 25, 27 can be adjusted with respect to the machine base 1.

The gear blank rotating mechanism 24 comprises a rotary member 34 journalled in the frame 25 parallel to the guide grooves 23 and having a gear blank holding part 34a at the outer end for holding a gear blank M and a brake means 35 for controlling the rotation of the rotary member 34 which comprises a pair of similar brake bands 39. One end of the brake band 39 is suitably journalled and the other or free end of the brake band is engaged by a coiled spring 37 disposed about an adjusting rod 38 which extends through the free end of the associated brake band 39.

The frame 27 of the gear blank rocking mechanism 26 rotatably supports a main shaft 41 which extends through the member 27a, frame 27 and rotary member 34 and has splines 40 at an intermediate point between the opposite ends for engaging in the rotary member 34 and a worm wheel 42 secured to the main shaft in a position between the opposite ends of the shaft as seen in FIG. 2 so that the main shaft 41 can move slidably with respect to the mechanisms 24 and 26. The frame 27 also rotatably supports a worm shaft 44 having a worm 43 which is in engagement with the worm wheel 42 and a cam shaft 45 extending parallel to the worm shaft 44 for imparting rocking movement to the support member 22.

The worm shaft 44 is connected to the output shaft of a motor 47 which is mounted on a gear box 46 secured to the frame 27 of the rocking mechanism 26. The cam shaft 45 has a gear 48 secured to the upper end thereof and the gear 48 engages a gear 49 mounted on the worm shaft 44 with a rotation ratio of 1 to 1. The rotation of the motor 47 rotates the worm shaft 44 and cam shaft 45.

When the gear ratio between the worm shaft 44 and main shaft 41 is set as 1 to 30, for example, as the worm shaft 44 rotates one complete rotation, the main shaft 41 rotates 1/30 rotation.

The lower end of the cam shaft 45 extends beyond the frame 27 of the rocking mechanism 26 and has a cam plate 50 secured to the extended end of the cam shaft and a constant pressure cylinder 52 is adapted to bias the support member 22 so that the leading curved surface of the cam plate 50 always abuts against a rotor 51 mounted on a stub shaft extending upwardly through the holding table 16. Thus, since the cam plate 50 rotates while abutting against the rotor 51, the gear blank rotating mechanism 24 supported on the support member 22 arcuately rocks one way and then the other about the support shaft 2 in accordance with the height of the leading curved surface of the cam plate 50. And as mentioned hereinabove, since the cam shaft 45 and main shaft 41 have the rotation ratio of 30 to 1, as the main shaft 41 rotates one complete rotation, the gear blank rotating mechanism 24 rocks 30 times. The cam plate 50 has the leading curvature in conformity with the tooth profile such as the involute curvature of a bevel gear to be processed and a relief which rocks in an amount somewhat greater than the height of the teeth of the bevel gear corresponding to the addendum circle of such a bevel gear to be processed. In FIG. 2, reference numeral 53 denotes a high speed rotary cutter. The cutter can be replaced by a grinding wheel if desired.

With the above-mentioned construction and arrangement of the component parts of the bevel gear cutting device of the invention, in operation, the preformed bevel gear blank M is firmly held in the holding part 34a of the rotary member 34 and the manual adjusting knob 32 is then manipulated to move the frame 25 of the gear blank rotating mechanism 24 along the support member 22 until the apex of the conical shape of the blank M will lie in an extension of the axis of the support shaft 2. Thereafter, the manual knob 33 is manipulated to cause the frame 27 of the rocking mechanism 26 to move slidably on the movable support member 22 to a position suitable for performing a particular cutting operation on the gear blank M. Similarly, the manual knob 20 is manipulated to move the holding table 16 until the axis of the rotor 51 is aligned with the axis of the cam shaft 45 of the cam plate 50. Next, the height and position of the high speed rotary cutter 53 are adjusted until the leading end of the high speed cutter 53 passes through the apex of the conical shape of the blank M and the support member 22 is rotated to the extreme end of its rocking movement range where the support member 22 is positioned most remote from the high speed cutter 53. Thereafter, the manual knob 14 is manipulated to adjust the angular position of the table support member 5 with respect to the machine base 1 so as to cause the generatrix of the conical shape of the blank M to coincide with the movement locus of the high speed rotary cutter 53. After the above-mentioned adjusting operation has been completed, the high speed cutter 53 is rotated by the drive means (not shown) and at the same time slowly moved towards and away from the generatrix of the gear blank M. While the high speed cutter 53 is rotating and moving in the manner as mentioned hereinabove, the motor 47 is energized to rotate the main shaft 41 and accordingly, the blank M at a low speed. The rotating gear blank M is rocked toward and away from the cutter 53 in a horizontal plane whereby the gear blank M is gradually formed with teeth the number of which teeth varies depending upon the rotation ratio between the cam plate 50 and main shaft 41, e.g., 30 teeth. According to the present invention, it is also contemplated that the high speed rotary cutter 53 is rocked and the gear blank M is fed in the generatrix thereof by reversing the above-mentioned movement mode in which the gear blank M is rocked and the high speed rotary cutter 53 is fed linearly.

As mentioned hereinabove, according to the present invention, during the conical bevel gear blank M is rotating about its axis, the high speed rotary cutter 53 is rocked in synchronization with the rotational movement of the blank within the distance range extending from a position just above the upper surface of the blank to the deddendum circle of teeth to be formed on the blank each time the gear blank rotates the angular distance corresponding to the pitch between two adjacent teeth and the cutting edge of the rotary cutter moves gradually towards the generatrix of the gear blank at a low speed in the same plane as the rocking plane of the axis of the cone shape of the gear blank to thereby provide a tooth profile such as an involute tooth profile with high precision and high efficiency.

According to the present invention, it is also contemplated that the cam and gear arrangement is controlled by a computer (not shown).

While only one embodiment of the invention has been shown and described in detail, it will be understood that the same is for illustration purpose only and not to be taken as a definition of the invention, reference being had for this purpose to the appended claims.

I claim:

1. A bevel gear cutting device comprising a stationary machine base, a support shaft extending uprightly from said machine base, a table support member mounted at one end on said support shaft for rotation about the axis of the shaft and adjustable with respect to said machine base in alignment with the generatrix of a bevel gear blank, a holding table adjustably supported on said table support member having a rotor, a gear blank rotating and rocking mechanism support member mounted at one end on said support shaft for rotation about the axis of the shaft, a gear blank rotating mechanism slidably supported on said gear blank rotating and rocking mechanism support member and having a rotary gear blank holding member at the leading end, a gear blank rocking mechanism slidably supported on said gear blank rotating and rocking mechanism support member, a main shaft extending through said gear blank rotating mechanism and keyed to said gear blank rocking mechanism, means to rotate said gear blank rocking mechanism at a rate greater than the rotational rate of said main shaft by the number of teeth to be formed on said gear blank and including a cam plate cooperable with said rotor, adjustment means acting on said gear blank rotating mechanism to position the virtual apex of the cone shape of said gear blank on an extension of the axis of said support shaft, means for biasing said cam plate towards said rotor on the holding table, and a high speed cutter movable along the generatrix of said gear blank cone at a low speed in the same plane as the rocking plane of the axis of the cone shape of said gear blank so as to reciprocally move the cutting edge of the cutter between a position just above the conical surface of the gear blank to the deddendum to thereby cut teeth on the gear blank in conformity with the leading curved face of said cam plate.

2. A bevel gear cutting device comprising a stationary machine base, an upright support shaft extending upwardly from said machine base, a table support member rotatably supported at one end on said support shaft, a holding table adjustably supported on said table support member and having a rotor, a gear blank rotating and rocking mechanism support member rotatably supported at one end on said support shaft and having a cam plate engaging with said rotor on the holding table, a gear blank rotating mechanism slidably supported on said gear blank rotating and rocking mechanism support member and a gear blank rocking mechanism slidably supported on said gear blank rotating and rocking mechanism support member in alignment with said gear blank rotating mechanism and having a main shaft extending through the rocking mechanism and keyed to said gear blank rotating mechanism, and adjustment means acting on said gear blank rotating mechanism to enable adjustment of the virtual apex of the cone shape of said gear blank on an extension of the axis of said support shaft.

3. The bevel gear cutting device as set forth in claim 2, including roller guide grooves formed on the upper surface of said machine base, rollers depending from said table support member and engaging in said guide grooves, roller guide grooves formed in the upper surface of said table support member, rollers depending from said holding table and engaging in said guide grooves in the table support member, roller guide grooves formed in the upper surface of said gear blank rotating and rocking mechanism support member, and rollers depending from said gear blank rotating and rocking mechanisms and engaging in said guide grooves in the gear blank rotating and rocking mechanism support member.

4. The bevel gear cutting device as set forth in claim 1, further including means for adjusting said table support member, means for adjusting said holding table, and means for adjusting said gear blank rocking mechanism.

5. The bevel gear cutting device as set forth in claim 4, in which said adjusting means for the table support member comprises teeth formed on one side face of said machine base and a pinion mounted on said table support member in engagement with said teeth, said adjusting means for the holding table comprises an externally threaded rod supported on said table support member in a cantilever fashion, an internally threaded bracket depending from said holding table for threadably receiving said threaded rod and a manual adjusting knob secured to one end of said threaded rod, said adjusting means for the gear blank rotating mechanism comprises an externally threaded rod supported on said gear blank rotating and rocking mechanism support member in a cantilever fashion, an internally threaded bracket depending from the gear blank rotating mechanism for threadably receiving said second-mentioned externally threaded rod and a manual adjusting knob secured to the second-mentioned threaded rod and said adjusting means for the gear blank rocking mechanisn comprises an externally threaded rod supported on the gear blank rotating and rocking mechanism support member in a cantilever fashion, an internally threaded bracket depending from the gear blank rocking mechanism for threadably receiving the third-mentioned threaded rod and a manual adjusting knob secured to one end of the third-mentioned threaded rod.

* * * * *